United States Patent
Peters et al.

(10) Patent No.: US 6,319,110 B1
(45) Date of Patent: Nov. 20, 2001

(54) METHOD AND DEVICE FOR CARVING POULTRY CARCASSES AND/OR CARCASS PARTS

(75) Inventors: Manfred Peters, Bad Schwartau; Wolfgang Wagner, Reinfeld; Siegbert Wruck, Stralsund; Klaus Ziebell, Lübeck, all of (DE)

(73) Assignee: Nordischer Maschinenbau Rud. Baader GmbH & C. KG, Lubeck (DE)

( * ) Notice: Subject to any disclaimer, the term of this patent is extended or adjusted under 35 U.S.C. 154(b) by 0 days.

(21) Appl. No.: 09/600,912
(22) PCT Filed: Jan. 20, 1999
(86) PCT No.: PCT/EP99/00352
  § 371 Date: Sep. 5, 2000
  § 102(e) Date: Sep. 5, 2000
(87) PCT Pub. No.: WO99/37161
  PCT Pub. Date: Jul. 29, 1999

(30) Foreign Application Priority Data

Jan. 24, 1998 (DE) .............................................. 198 02 693
Dec. 3, 1998 (DE) .............................................. 198 55 840

(51) Int. Cl.$^7$ .................................................. A22C 21/00
(52) U.S. Cl. .......................... 452/149; 452/452; 452/151; 452/152; 452/155; 452/165
(58) Field of Search .................................. 452/149, 151, 452/152, 153, 155, 160, 165, 170, 163

(56) References Cited

U.S. PATENT DOCUMENTS

| | | | |
|---|---|---|---|
| 4,270,243 | * | 6/1981 | Lewis ................................... 452/160 |
| 4,373,232 | * | 2/1983 | Harding et al. ....................... 452/160 |
| 4,815,168 | | 3/1989 | van den Nieuwelaar et al. . |
| 5,015,213 | | 5/1991 | Hazenbroek . |
| 5,019,013 | | 5/1991 | Hazenbroek . |
| 5,035,673 | * | 7/1991 | Hazenbroek .......................... 452/149 |
| 5,147,240 | * | 9/1992 | Hazenbroek et al. ................ 452/160 |
| 5,194,035 | * | 3/1993 | Dillard .................................. 452/149 |

* cited by examiner

Primary Examiner—Willis Little
(74) Attorney, Agent, or Firm—Mattingly, Stanger & Malur, P.C.

(57) ABSTRACT

A method for dividing a body of slaughtered poultry is described, wherein the body hangs down by its legs from a transport means, is transported with the breast leading in the direction of transport and is cut through during transport thereof by means of a first cutting operation, wherein the body is brought into a position inclined to the direction of transport before and during the first cutting operation so that the legs are located in front of the remaining body, wherein the body is moved towards a spike in such a manner that the spike enters a rear opening between the legs located between the legs of the body and the first cutting operation is performed in a diagonal direction in a plane which essentially extends between the thighs of the legs and the spike so that the body is divided into a rear half including the legs, the thigh portions corresponding to the legs and a back portion, and a front half including a breast portion and a main proportion of the back portion of the body, wherein the front half surrounds the spike and is held thereby and is transported along a special path and in a special position to an adjoining processing station which comprises at least one separating means, wherein the rear half is transported by the transport means to the processing station wherein the rear half and the front half are divided essentially vertically by the at least one separating means by means of at least one second cutting operation.

16 Claims, 6 Drawing Sheets

METHOD AND DEVICE FOR CARVING POULTRY CARCASSES AND/OR CARCASS PARTS

Figure 1:
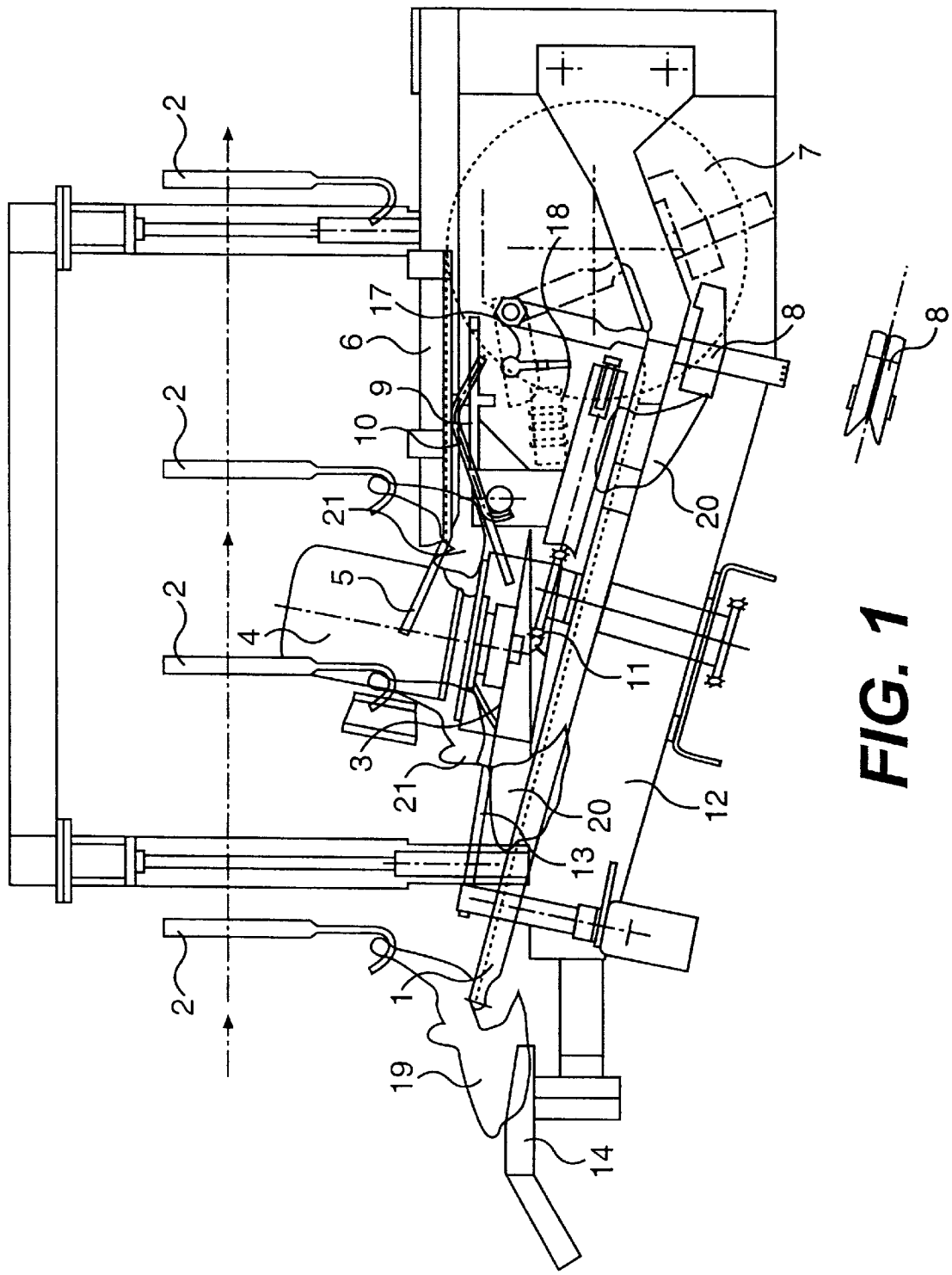

The invention concerns a method and an apparatus for dividing carcasses and/or carcass parts of poultry.

An invention of this kind is known from EP 0 310 713 B1, in which a method and an apparatus for dividing a carcass of slaughtered poultry are disclosed, the latter comprising an arm which is mounted so as to be pivotably connected to the extension of an essentially rod-shaped holder and to the end thereof, wherein it is suitable to pass via the rear opening through the front half of the slaughtered poultry and to hold the back portion of the front half in order thus to guide the front half to an adjoining processing station. A drawback here is that several separating elements are necessary for dividing front and rear halves. Furthermore exact symmetrical division is not possible with the apparatus disclosed, which has an adverse effect on the quality of the end product. In particular division of the front halves is problematic when considered closely. With young poultry the breastbone is very resilient and tends to shift to the side, which makes symmetrical division almost impossible. With older poultry the breastbone sections are highly ossified, which results in these regions shattering in case of incorrect division, which adversely affects the product quality.

It is the object of the present invention to provide a method and an apparatus which avoid the above-mentioned drawbacks and allow a better product at the same time with more efficient use of apparatus.

The object is achieved according to the invention by the fact that a method for dividing a carcass of slaughtered poultry is provided, wherein the carcass hangs down by its legs from a transport means, is transported with the breast at the front in the direction of transport and is cut through during transport thereof by means of a first cutting operation, wherein the carcass before and during the first cutting operation is brought into a position inclined to the direction of transport so that the legs are located in front of the rest of the carcass, wherein the carcass is moved towards a spike in such a way that the spike enters a rear opening between the legs located between the legs of the carcass and the first cutting operation is performed in a diagonal direction in a plane which passes essentially between the thighs of the legs and the spike, so that the carcass is divided into a rear half including the legs, the thigh portions corresponding to the legs and a back portion, and a front half including a breast portion and a main proportion of the back portion of the carcass, wherein the front half surrounds the spike and is held thereby and is transported along a special path and in a special position to an adjoining processing station comprising at least one separating means, wherein the rear half is transported by the transport means to the processing station, wherein the rear half and the front half are essentially vertically divided by the at least one separating means with at least one second cutting operation. In this way further expenditure on a third cutting device is saved, which leads to more efficient use of resources.

A development according to the invention provides that a method is provided in which the rear half passes by the transport means with progressive conveying into a guide region in which the rear half is centred relative to a subsequent dividing plane, so that it is symmetrically vertically divided by the subsequently arranged cutting operation. An advantage here is that the increasing demands of end consumers with respect to product quality can be met.

In another development according to the invention it is provided that the front half surrounding the spike passes by means of an auxiliary conveyor with progressive conveying into a guide region in which the front half is centred relative to a subsequent dividing plane, so that it is symmetrically vertically divided by the subsequently arranged cutting operation. An advantage here is that the demands of end consumers with respect to product quality are met.

Further it can be provided according to the invention that the rear and front halves are divided essentially simultaneously by at least one separating means. Advantageously two cutting operations are completed at once in a very narrow space.

The object is achieved according to the invention by the fact that an apparatus is provided including at least one knife, an element plus controller for breastbone centring of the front halves arranged behind an auxiliary conveyor, and at least one pressing device, a guide, a centring guide and a transport means for the rear halves, wherein the rear halves with the transport means can be brought essentially between the guide and the pressing device, wherein the at least one knife is arranged in such a way that the front and/or rear halves which are moved towards the knife can be divided. In an alternative embodiment there is at least one dislocating bar, wherein the dislocating bar which is suitable for dislocating the joints is arranged essentially between the guide, the centring guide, the pressing device and the knife. The control element acts on the one hand as a counterholder during breastbone centring, on the other hand it acts as a return device on reaching a given angular position in which a controller switch triggers a control pulse, so that e.g. by means of compressed air the control element is reset to the starting position.

The object is achieved according to the invention by the fact that an apparatus is provided for dividing the carcass of slaughtered poultry, including a transport system which is connected to a frame and which is suitable for hanging up the carcass by its feet and transporting it with the breast at the front, at least one cutting device and a spike which is mounted so as to be connected to the frame, wherein the end of the spike is suitable for passing through the rear opening located between the feet into the poultry carcass, so that during further transport the breast of the carcass is rotated forwards in the direction of transport and the carcass is cut through in a diagonal direction by at least one cutting element of the cutting device above the lower side of the rear opening in such a way that the carcass is divided into a rear half including the feet, the thigh portions corresponding to the feet and part of the back, and a front half including a breast portion and the main proportion of the back portion of the carcass, is mounted and suitable for passing via the rear opening through the front half and holding the back portion of the front half, in order thus to guide the front half by means of an auxiliary conveyor to an adjoining processing station, wherein the rear half can be guided by means of the transport system to the processing station.

A development according to the invention provides that the spike comprises a recess for receiving the at least one knife. An advantage here is that the front half can be divided exactly centrally.

In another development according to the invention it is provided that the element for breastbone centring is designed as a pendulum. Movement of the pendulum is effected parallel to the knife plane, or in the same plane. Here it is an advantage that the front half can be divided exactly in its plane of symmetry.

Further it can be provided according to the invention that the element for breastbone centring has an essentially wedge-shaped recess for receiving the breastbone of the front half. This is effected in such a way that the auxiliary conveyor conveys the front halves, which are lined up on the spike, in the direction of the element for breastbone centring which is fixed to a pendulum, so that the breastbone of the corresponding front half, which protrudes in the direction of conveying, finds its way into the wedge-shaped recess of the element for breastbone centring and, due to the wedge-shaped taper in the element itself, undergoes centring by its own movement. As the element is mounted in a pendulum, it performs a circular movement, caused by the forward movement of the front half, and in the process further centres the front half. The recess of the element opens into a guide which is suitable for receiving the knife, wherein the movement of the pendulum or its element for breastbone centring takes place parallel to the knife plane or in the same plane, wherein this plane is identical with the dividing plane of the rear half. In this way the front half is supplied centred on the knife, wherein the knife is guided by the element for breastbone centring or in its guide which opens out in the wedge-shaped recess. The advantage with this solution lies in that the poultry can be divided through its plane of symmetry.

The object is achieved according to the invention by the fact that a method is provided for dividing carcasses and/or carcass parts of poultry, using at least one apparatus described above. An advantage here is that the method can be operated both with whole poultry carcasses and with parts thereof.

Figure 2:
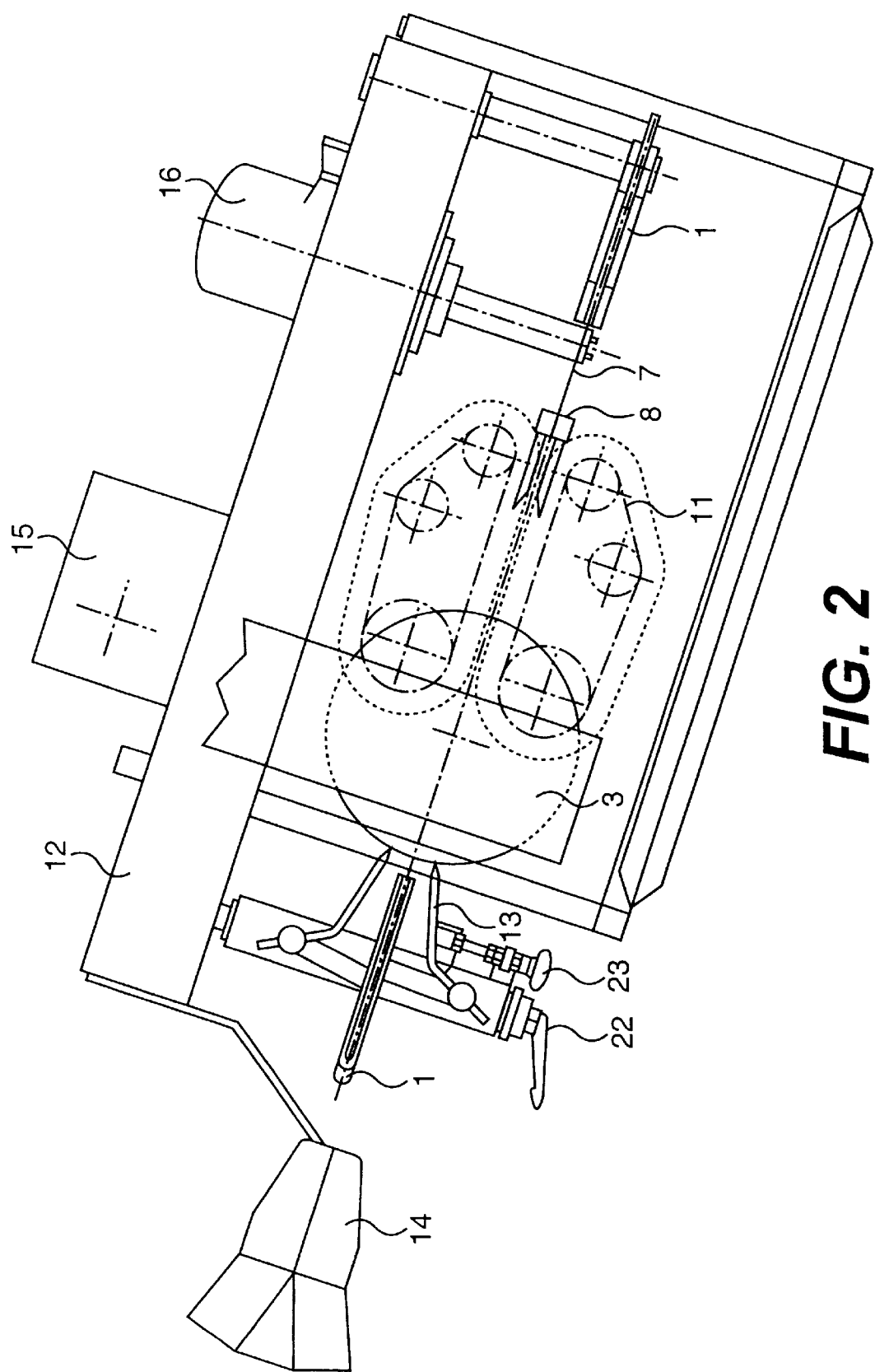
Figure 3:
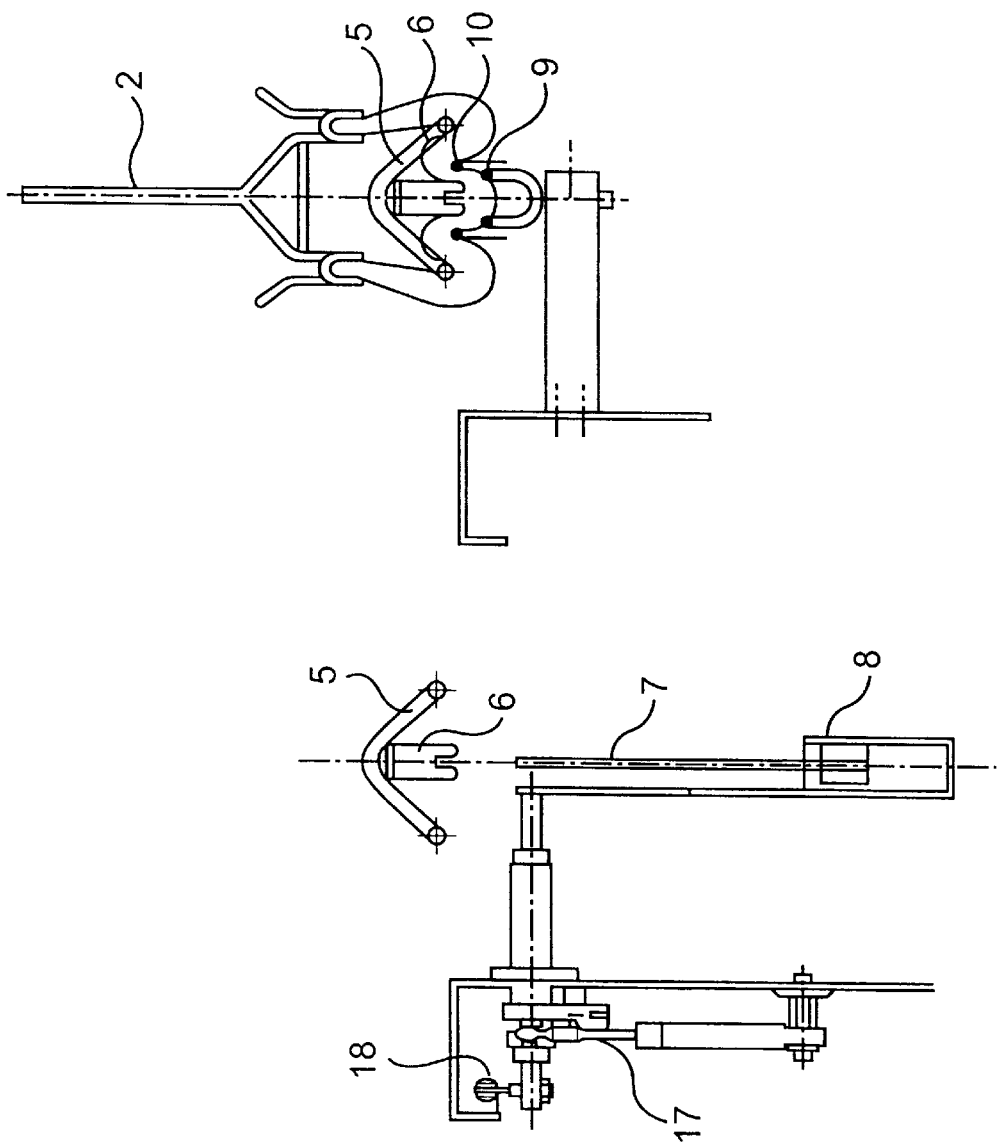
Figure 4:
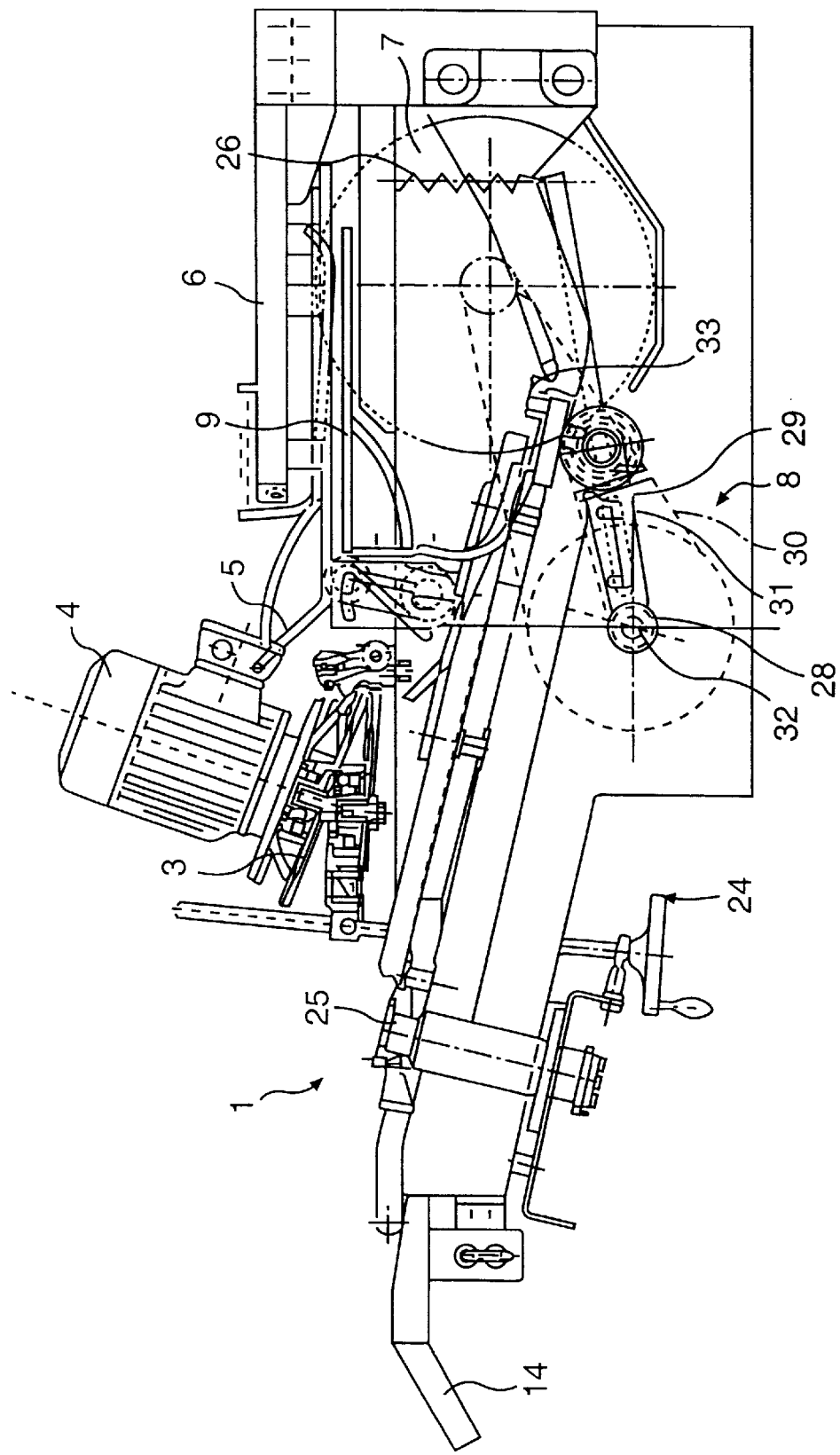
Figure 5:
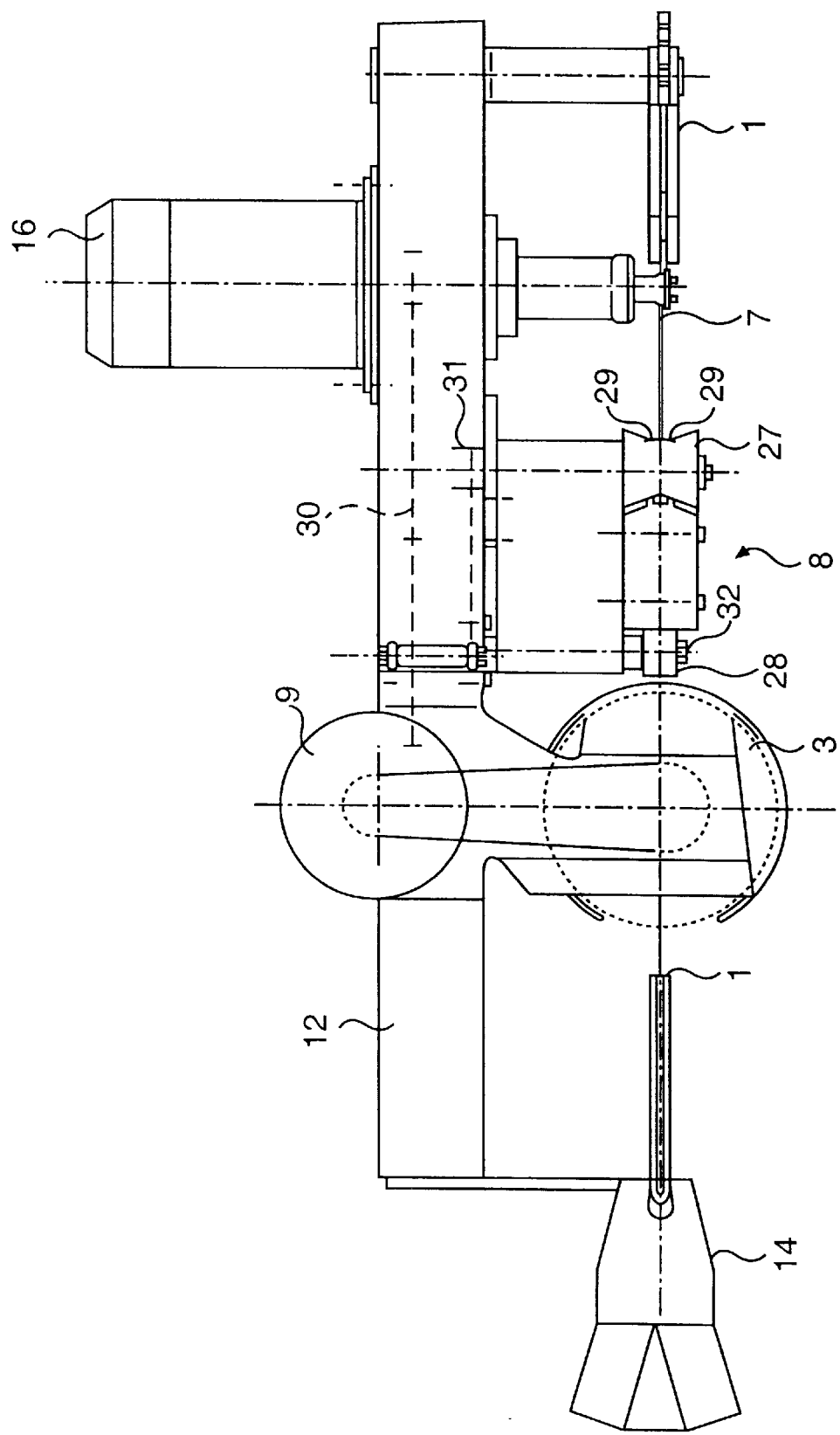
Figure 6:
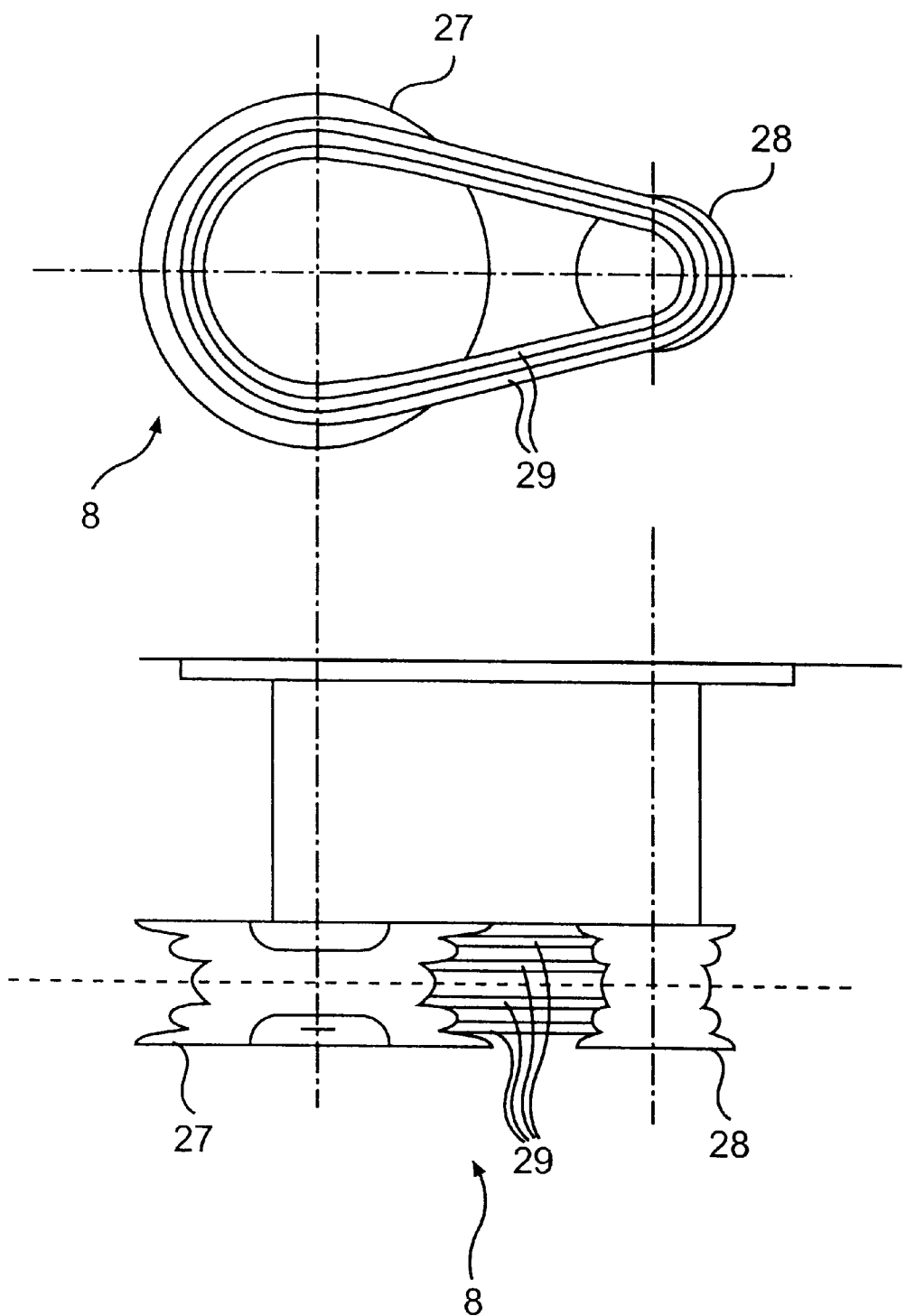

The invention is described below with the aid of the drawings, which show:

FIG. 1 an apparatus for dividing, the element for breastbone centring is shown as a detail additionally in a top view;

FIG. 2 a top view of the apparatus shown in FIG. 1;

FIG. 3 a view of the breastbone centring element together with associated controller, FIG. 4 an apparatus for dividing poultry carcasses;

FIG. 5 a top view of the apparatus shown in FIG. 4;

FIG. 6 an enlarged view of the breastbone centring element according to FIGS. 4 and 5.

The apparatus shown in FIG. 1 for dividing poultry 19 has a spike 1 which extends across the width of the whole apparatus with an inclination of between zero to thirty degrees, referred to the horizontal. The shackles 2 of the transport system serve to supply the apparatus with poultry, wherein the poultry hanging by the legs is supplied to the apparatus from above. Furthermore FIG. 1 shows a knife 3 with which the poultry carcass in a first cutting operation is divided into two portions, wherein this knife of fixed location is moved by the knife drive 4. The guide 5 which serves for rough moves, from the viewpoint of the approaching rear half 21 of the poultry, at an angle towards the central guide 6 by means of which the rear half 21 is positioned exactly for the following longitudinal cut, wherein positioning is assisted by the pressing device 9. In FIG. 1 is additionally shown a dislocating bar 10 which is wanted for certain product specifications. But the apparatus shown also functions without the dislocating bar shown. During the subsequent separation of the legs from the rear portion, the presence of the dislocating bar 10 has the effect that a higher proportion of meat remains on the legs. This cut and the one for longitudinal division of the front half are made with knife 7. Breastbone centring 8 is effected with a rotatably mounted pendulum onto which the front halves 20 are pushed by means of the auxiliary conveyor 11 operated by drive 15 in such a way that the breastbone enters the element for breastbone centring ahead, self-centring being effected by the wedge-like shape of the element. The element for breastbone centring 8 is split so that, on the side of the element opposite the breastbone, the fixed knife 7 driven by motor 16 can enter the element for breastbone centring 8 due to the forward movement of the front half 20 and hence of the element for breastbone centring 8. During further forward movement of the front half 20, of which the breastbone is still centred by the wedge-shaped recess of the element for breastbone centring 8, the knife 7 passes into the region of the wedge-like shape and divides the still-centred front half into two symmetrical longitudinal portions. The element for breastbone centring 8 has a controller for breastbone centring 17, which in an end position which is disclosed in broken lines in this form shown in FIG. 1 operates a controller switch 18, wherein there is then generated a control pulse by means of which the controller is first conveyed away and then to its starting position.

The whole apparatus is mounted in a housing 12 which is usual in this frame-like design in poultry processing. In order also to be able to perform exactly the first cutting operation in which the poultry is divided into front half 20 and rear half 21, a centring means 13 is provided for the so-called breast cut on the knife 3. The poultry, which by means of the shackle 2 runs onto a feed or entering chute 14 in order then to receive the spike 1, is guided by the forward movement of the shackle 2 into the input region of the centring means 13. By means of the height adjusting device 22 and the width adjusting device 23, the centring means 13 can be set so that the cut is made at the location which is to be precisely defined.

The apparatus which is shown in FIG. 2 has a spike 1 which is divided in the region of the knife 7 and which surrounds this fixed knife 7 and extends across the width of the whole apparatus. Furthermore FIG. 2 shows a knife 3 with which the poultry carcasses are divided into two portions in a first cutting operation, this fixed knife 3 being moved by the knife drive, which for reasons of clarity is not shown. The cut for longitudinally dividing the front half 20 is made by means of knife 7. The element for breastbone centring 8 is effected by means of a rotatably mounted pendulum which can be seen in FIGS. 1 and 3 and onto which the front half is pushed by means of the auxiliary conveyor 11 operated by drive 15, in such a way that the breastbone enters the element for breastbone centring 8 ahead, self-centring being effected by the wedge-like shape of the element. The element for breastbone centring 8 is split, so that on the side of the element opposite the breastbone the fixed knife 7 driven by motor 16, due to the forward movement of the front half 20 and hence of the element for breastbone centring 8, can enter the element. During further forward movement of the front half 20, of which the breastbone is still centred by the wedge-shaped recess of the element for breastbone centring 8, the knife 7 passes into the region of the wedge-like shape and divides the still-centred front half into two symmetrical longitudinal portions. The element for breastbone centring 8 is shown in a position in which the knife 7 has not yet reached the wedge-shaped region of the element for breastbone centring 8.

The whole apparatus is mounted in a housing 12, which is usual in poultry processing. In order also to be able to perform exactly the first cutting operation in which the poultry is divided into front half 20 and rear half 21, a centring means 13 is provided for the breast cut at the knife 3. The poultry, which by means of the shackle 2 runs onto the feed or entering chute 14 in order then to receive the spike 1, is guided by the forward movement of the shackle 2 into the input region of the centring means 13. By means of the height adjusting device 22 and the width adjusting device 23, the centring means 13 is set so that the cut is made at the location which is to be precisely defined, or in the desired cutting plane.

In FIG. 3 is shown on the one hand the positioning of the centred rear half which, hanging by the shackle 2, is centred between guide 5, central guide 6 and pressing device 9 and dislocating bar 10. On the other hand the arrangement of the knife 7 is shown, how it is guided both in the central guide 6 which is located below the guide 5, and in the element for breastbone centring 8. Likewise the controller for breastbone centring 17 can be seen, how it is linked to the pendulum-like element for breastbone centring. The controller for breastbone centring 17 disclosed in FIG. 3 is in this view in the switching position in which it operates the controller switch 18, which in turn causes a pulse which ensures that the controller for breastbone centring 17 returns the pendulum-like element for breastbone centring 8 to its starting position, which is shown in unbroken lines in FIG. 1.

The apparatus shown in FIG. 4 for dividing poultry has a spike 1 which extends across the width of the whole apparatus with an inclination which can be between zero to thirty degrees, referred to the horizontal. The shackles of the transport system which can be seen in FIG. 1 serve to supply the apparatus with poultry, wherein the poultry hanging by the legs is fed to the apparatus from above. Furthermore in FIG. 4 is shown a knife 3 with which the poultry carcass is divided into two portions in a first cutting operation, this fixed knife being moved by the knife drive 4. The guide 5 which serves for rough centring runs, from the viewpoint of the approaching rear half 21 of the poultry which is shown in FIG. 1, at an angle towards the central guide 6 by means of which the rear half 21 is exactly positioned for the following longitudinal cut, the positioning being assisted by the pressing device 9. This cut and the one for longitudinally dividing the front half are made by means of knife 7. The element for breastbone centring 8 is effected by means of a centring wheel 27 which is mounted rotatably about the pivot point 32 and onto which the front halves 20 are pushed by means of the element for breastbone centring 8 driven by the motor 16 via the drive 30, 31, in conjunction with the round belts 29 which are guided by deflection wheel 28 and centring wheel 27, in such a way that the breastbone enters the element for breastbone centring 8 ahead, self-centring being effected by the wedge-like arrangement of the round belts 29 and of the centring wheel 27 of the element. The element for breastbone centring 8 is split, so that on the side of the element opposite the breastbone, the fixed knife 7 driven by motor 16 can enter the element for breastbone centring 8 due to the forward movement of the front half 20 and hence of the element for breastbone centring 8. During further forward movement of the front half 20, of which the breastbone is still centred by the wedge-shaped recess of the element for breastbone centring 8, the knife 7 passes into the region of the wedge-like shape and divides the still-centred front half into two symmetrical longitudinal portions. The element for breastbone centring 8 is constantly pressed by means of spring 26 against the front halves being conveyed.

The whole apparatus is mounted in a housing 12 which is usual in this frame-like design in poultry processing. In order also to be able to perform exactly the first cutting operation in which the poultry is divided into front half 20 and rear half 21, a entrainer 25 which runs synchronously with the shackle chain shown schematically in FIG. 1 is provided for the so-called breast cut on the knife 3. The poultry, which by means of the shackle 2 runs onto a feed or entering chute 14 in order then to receive the spike 1, is guided by the forward movement of the shackle 2 into the input region of the entrainer 25. By means of the circular knife height adjusting device 24, the cut can be made at the predefined location.

The apparatus for dividing poultry shown in FIG. 5 shows the spike 1, which extends across the whole apparatus, only in a detail from above. The shackles of the transport system from FIG. 1 are omitted for clarity's sake. FIG. 5 shows a knife 3 with which the poultry carcass is divided into two portions in a first cutting operation, this fixed knife being moved by the knife drive 4. The cut for longitudinally dividing the front half of the poultry carcass is made by means of knife 7. The element for breastbone centring 8 is effected by means of a centring wheel 27 which is mounted rotatably about the pivot point 32 and onto which the front halves 20 (FIG. 1) are pushed by means of the element for breastbone centring 8 driven by the motor 16 via the drive 30, 31, in conjunction with the round belts 29 which are guided by deflection wheel 28 and centring wheel 27, in such a way that the breastbone enters the element for breastbone centring 8 ahead, self-centring being effected by the wedge-like arrangement of the round belts 29 and of the centring wheel 27 of the element. The element for breastbone centring 8 is split, so that on the side of the element opposite the breastbone, the fixed knife 7 driven by motor 16 can enter the element for breastbone centring 8 due to the forward movement of the front half 20 and hence of the element for breastbone centring 8. During further forward movement of the front half 20, of which the breastbone is still centred by the wedge-shaped recess of the element for breastbone centring 8, the knife 7 passes into the region of the wedge-like shape and divides the still-centred front half into two symmetrical longitudinal portions. The element for breastbone centring 8 is constantly pressed by spring force against the front halves being conveyed.

The whole apparatus is mounted in a housing 12 which is usual in this frame-like design in poultry processing. The poultry, which by means of the shackle runs onto a feed or entering chute 14 in order then to receive the spike 1, is guided by the forward movement of said shackle into the input region of the entrainer 25, which can be seen only in FIG. 4. By means of the circular knife height adjusting device 24, the cut can be made at the predefined location. The range of the entrainer 25 shown only in FIG. 4 ends at the deflection wheel 33 (FIG. 4), so that the detached front halves are transferred seamlessly to within range of the element for breastbone centring 8, which also performs conveying functions by means of the round belts 29, so that there is always predefined conveying of the front half.

In FIG. 6 is shown the element for breastbone centring 8. Here can be seen the conical arrangement of the round belts 29 which are positioned in special grooves on the centring wheel 27 and the deflection wheel 28. The variant which is shown in FIG. 6 differs from the variant which is shown in FIGS. 4 and 5 in that more round belts are used in FIG. 6, which allows more planar transport of the front half of the poultry carcass.

LIST OF REFERENCE NUMBERS 1 spike
2 shackle
3 knife
4 knife drive
5 guide
6 central guide
7 knife 8 breastbone centring element
9 pressing device
10 dislocating bar
11 chain
12 housing
13 centring means
14 feed or entering chute
15 drive
16 motor
17 controller for breastbone centring
18 controller switch
19 poultry
20 front half
21 rear half
22 height adjusting device
23 width adjusting device
24 circular knife height adjusting device
25 entrainer
26 spring
27 centring wheel
28 deflection wheel
29 round belt
30 drive
31 drive
32 pivot point
33 deflection wheel

What is claimed is:

1. Method for dividing a carcass of slaughtered poultry, in which the carcass
    (a) hangs down by its legs from a transport means,
    (b) is transported with the breast at the front in the direction of transport, and
    (c) is cut through during transport thereof by means of a first cutting operation, wherein the carcass before and during this first cutting operation is so brought into a position inclined to the direction of transport that the legs are located in front of the rest of the carcass, and is moved towards a spike in such a way that the spike enters a rear opening between the legs located between the legs of the carcass and the first cutting operation is performed in a diagonal direction in a plane which passes essentially between the thighs of the legs and the spike, in such a way that the carcass is divided into a rear half including the legs, the thigh portions corresponding to the legs and a back portion, and a front half including a breast portion and a main proportion of the back portion of the carcass, wherein the front half surrounds the spike and is held thereby and is transported along a special path and in a special position to an adjoining processing station comprising at least one separating means, characterized in that the rear half too is transported by the transport means to this adjoining processing stations and both the rear half and the front half are essentially vertically divided by the at least one separating means with a second cutting operation.

2. Method according to claim 1, characterized in that the rear half passes with progressive conveying by the transport means, into a guide region in which the rear half is so centred relative to a subsequent dividing plane, that it is symmetrically vertically divided by the subsequent cutting operation.

3. Method according to claim 1, characterized in that the front half surrounding the spike passes, with progressive conveying by means of an auxiliary conveyor, into a guide region in which the front half is so centered relative to a subsequent dividing plane, that it is symmetrically vertically divided by the subsequent cutting operation.

4. Method according to claim 1, characterized in that the rear and front halves are divided essentially simultaneously by the at least one separating means.

5. Method according to claim 1, characterized in that dislocation of the joints is effected before division of the rear half.

6. Apparatus for dividing the carcass of slaughtered poultry, including
    (a) a transport system (2) which is connected to a frame and which is suitable for hanging up the carcass (19) by its feet and transporting it with the breast at the front,
    (b) a cutting device with at least one cutting element (3) for cutting through the carcass above the lower side of the rear opening in a diagonal direction by at least one cutting element of the cutting device above the lower side of the rear opening in such a way that the carcass is divided into a rear half (21) including the feet, the thigh portions corresponding to the feet and part of the back, and a front half (20) including a breast portion and the main proportion of the back portion of the carcass (19), with at least one cutting element (3) for cutting through the carcass above the lower side of the rear opening in a diagonal direction by at least one cutting element of the cutting device above the lower side of the rear opening in such a way that the carcass is divided into a rear half (21) including the feet, the thigh portions corresponding to the feet and part of the back, and a front half (20) including a breast portion and the main proportion of the back portion of the carcass (19), and
    (c) a spike (1) which is mounted connected to the frame, as well as an auxiliary conveyor (11) for a portion of the poultry carcass, characterized in that the end of the spike is designed to pass through the rear opening located between the feet into the poultry carcass, so that during further transport the breast of the carcass (19) is rotated forwards in the direction of transport, and to pass via the rear opening through the front half (20) and hold the back portion of the front half (20), in order thus to guide the front half (20) by means of the auxiliary conveyor (11) to an adjoining processing station including at least one second knife (7), while the rear half (21) can be fed by means of the transport system (2) likewise to this processing station.

7. Apparatus according to claim 6, including at least one knife (7), the auxiliary conveyor 11 arranged in front of the knife (7) and an element for breastbone centering (8) of the front halves (20) arranged behind the auxiliary conveyor (11, 25), characterized by at least one pressing device (9), a guide (5), a centering guide (6) and a transport means (2) for the rear halves (21) which with the transport means (2) can be moved essentially between the guide (5) and the pressing device (9), wherein the at least one knife (7) is arranged in such a way that the front and rear halves which are moved towards the latter can be divided.

8. Apparatus according to claim 7, characterized in that in front of the knife (7) in the region of guide (5), centring guide (6) and pressing device (9) is arranged a dislocating bar (10) for dislocating the joints.

9. Apparatus according to claim 6, characterized in that the spike (1) comprises a recess for receiving the at least one knife (7).

10. Apparatus according to claim 6, characterized in that the end of the spike (1) is constructed in one piece with the latter.

11. Apparatus according to claim 6, characterized in that the element for breastbone centering (8) is designed as a pendulum.

12. Apparatus according to claim 11, characterized in that the pendulum is movable parallel to the knife plane.

13. Apparatus according to claim 11, characterized in that the element for breastbone centering (8) has essentially wedge-shaped recess for receiving the breastbone of the front half (20).

14. Apparatus according to claim 13, characterized in that the recess opens into a guide which receives the knife (7).

15. Apparatus according to claim 13, characterized in that the pendulum or its element for breastbone centering (8) is movable parallel to the knife plane.

16. Apparatus according to claim 6, characterized in that the element for breastbone centering (8) arranged behind the auxiliary conveyor (11, 25) includes a controller (17).

\* \* \* \* \*